United States Patent [19]

Eberle

[11] 4,085,792

[45] Apr. 25, 1978

[54] METHOD OF CASTING LEAD ALLOY AUTOMOTIVE BATTERY PARTS

[75] Inventor: William J. Eberle, Reading, Pa.

[73] Assignee: General Battery Corporation, Reading, Pa.

[21] Appl. No.: 659,572

[22] Filed: Feb. 19, 1976

Related U.S. Application Data

[60] Continuation-in-part of Ser. No. 618,772, Oct. 2, 1975, Pat. No. 3,980,126, which is a continuation-in-part of Ser. No. 432,545, Jan. 11, 1974, Pat. No. 3,954,216, which is a continuation-in-part of Ser. No. 395,528, Sep. 10, 1973, Pat. No. 3,861,575, which is a division of Ser. No. 184,388, Sep. 28, 1971, abandoned.

[51] Int. Cl.$^2$ .............................................. B22C 3/00
[52] U.S. Cl. ........................................ 164/72; 249/114
[58] Field of Search ............................. 164/72, 6; 249/114–116, 135; 204/42, 58

[56] References Cited

U.S. PATENT DOCUMENTS

| | | | |
|---|---|---|---|
| 2,759,231 | 8/1956 | Parlanti | 249/114 X |
| 3,879,009 | 4/1975 | Mao | 249/135 |

OTHER PUBLICATIONS

The Surface Treatment and Finishing of Aluminum and its Alloys; Wernick, S and Pinner, R, 1964, pp. 56–57.

Primary Examiner—Richard B. Lazarus
Attorney, Agent, or Firm—Benasutti Associates, Ltd.

[57] ABSTRACT

A novel method of producing storage battery lead alloy parts is provided comprising the steps of (a) providing a grid mold having a mold substrate consisting essentially of aluminum, (b) hard surface anodizing at least a portion of said mold substrate to produce molding surface thereon, (c) introducing molten lead alloy into such mold against said molding surface and (d) allowing said lead alloy to cool to form said storage battery grid. Other steps which may be included as a novel method of the present invention including texturing the mold substrate prior to the hard surface anodizing step to form a discontinuous surface thereon, which texturing step may be accomplished by peening said substrate with shot, blasting said substrate with glass beads, or blasting said substrate with sand.

9 Claims, 1 Drawing Figure

METHOD OF CASTING LEAD ALLOY AUTOMOTIVE BATTERY PARTS

CROSS REFERENCE TO RELATED APPLICATIONS

This is a continuation-in-part of my prior copending patent application Ser. No. 618,772 filed Oct. 2, 1975, now U.S. Pat. No. 3,980,126, dated Sept. 14, 1976, entitled "Automated Post Burn Station" now U.S. Pat. No. 3,980,126, which in turn is a continuation-in-part application of U.S. patent application Ser. No. 432,545, filed Jan. 11, 1974 now U.S. Pat. No. 3,954,216, dated May 4, 1976, entitled "Apparatus for Thermal Relay Welding", which in turn is a continuation-in-part application of U.S. patent application Ser. No. 395,528, filed Sept. 10, 1973, now U.S. Pat. No. 3,861,575, dated Jan. 21, 1975, which in turn is a divisional application of U.S. application Ser. No. 184,338, filed Sept. 28, 1971 now abandoned.

BACKGROUND OF THE INVENTION

The present invention relates to the casting of lead alloy parts for automotive storage batteries, and more particularly, to the casting of lead alloy battery grids for use therein.

During the manufacture of electric storage batteries, and more particularly during the manufacture of electric storage battery plates therefor, lattice-like grids must be produced in order to receive and hold lead oxide pastes which are pasted thereon prior to the assembly and formation of the battery. Prior art methods of producing battery grids have included various stamping and casting processes. See for example U.S. Pat. Nos. 1,524,610, 2,079,727, 2,881,105, 3,408,236, 3,629,388, 3,779,816 and 3,009,459.

Although the difficulties encountered in casting battery grids are somewhat similar to those encountered in casting other lead parts for automotive batteries, the particular configuration of automotive battery grids and their intended end use within the battery make these parts particularly difficult to cast. Automotive battery grids are relatively thin substantially planar structures which consist essentially of a lattice of thin lead struts. In order to produce a high quality automotive battery, it is extremely important that the thickness of these grids be uniform and that the grids be substantially planar since any dimensional irregularities in these grids may present substantial problems when these grids are pasted and stacked to form the battery elements of a single storage battery. Additionally, each of these automotive battery grids must be designed to create a positive engagement between the grid material and the lead oxide paste which is applied thereto after casting. For this and other reasons, it is therefore sometimes desired to impart to the surface of the battery grids a rough texture, which texture further causes problems which may be encountered during the casting process, such as releasing the grids from the mold following casting. Finally, the surface to volume ratio of the conventional battery grid makes the heat transfer relation between the battery grid material and the mold material a very sensitive one.

Although the prior art is replete with methods of battery grid casting, including some methods in which the molds or mold substrates are coated prior to casting, only one such prior art method, a cork flour spray method, has experienced substantial commercial success. See U.S. Pat. Nos. 3,709,459 and 3,779,816. This method, as commonly practiced by the battery industry, uses a suspension of cork dust and clay in water and sodium silicate which is sprayed on the mold periodically, perhaps as often as once every three hours. This mold spray is used to impart a texture to the lead and to provide a slight insulating barrier between the molten lead alloy and the cast iron mold. This barrier permits the lead to remain molten while it flows properly into all areas of the mold.

Unfortunately, this cork flour spray method suffers from the disadvantages that as successive castings are taken, the spray wears thin and the dimensions of the battery grids which are produced by the molds tend to vary. Consequently, a casting from a freshly sprayed mold will be slightly undersized, whereas a mold from which many castings have been made will produce slightly oversized battery grids. As mentioned above, since minor dimensional irregularities in battery grids will produce great variations in the overall size of battery stacks to be produced therefrom, depending on the number of battery plates per stack, dimensional irregularities such as those encountered as cork spray coatings wear thin are undesirable due to (1) the wide tolerances which must be accomodated in the remainder of the battery production process, (2) the lack of uniformity in the finished product and (3) the amount of lead which is wasted when oversized battery grids are produced. For a discussion of this problem with respect to the pasting process, see U.S. Pat. No. 3,249,981. In spite of these disadvantages, the advantages provided by the cork flour spray process, including the advantage of being able to vary the finished texture of the battery grids produced thereby by varying the cork particle size applied thereto, results in the general acceptance of this process in the battery industry.

The configuration of prior art battery grid molds and several prior art battery grid mold coatings are disclosed in U.S. Pat. No. 3,779,816 (titanium oxide) and U.S. Pat. No. 3,709,459 (silicum nitride).

SUMMARY OF THE INVENTION

The present invention provides a novel method of casting small lead parts for automotive batteries, and more particularly, for casting automotive battery grids therefor. The process of the present invention generally comprises four steps:

(1) Providing a grid mold having a mold substrate consisting essentially of aluminum;

(2) Hard surface anodizing of at least a portion of said mold substrate to produce a molding surface thereon;

(3) Introducing molten lead alloy into said mold against said molding surface; and (4) Allowing said lead alloy to cool to form said storage battery grid.

Alternate steps which may be incorporated as a part of the process of the present invention include the additional step of texturing the mold substrate prior to hard surface anodizing step to form a discontinuous surface thereon. This texturing step may comprise the additional steps of (a) peening the substrate with shot, (b) blasting the substrate with glass beads and/or (c) blasting said substrate with sand.

It is possible using the process of the present invention to produce dimensionally precise molds which, in turn, will produce dimensionally precise battery grids. For example, in the preferred embodiment of the present invention wherein a molding surface of approximately 0.0050 inches thick is desired, the mold substrate should be milled to a dimension which is 0.0025 inches smaller than the desired mold size. Following the hard surface anodizing step, the final mold size will therefore be accomplished.

The result of the above described process, in addition to producing dimensionally uniform battery grids, is the provision of a battery grid molding process which allows the molten lead alloy which is introduced into the battery grid molding cavity to retain its molten state until it has flowed to fill all of the interstices of the battery grid mold cavity. It is believed that the provision of a hard surface anodized insulating surface on the aluminum mold substrate tends to insulate the molten lead from the aluminum substrate during the initial phases of the casting process, while during the later stages of the casting process this hard surface anodized insulating molding surface allows uniform relatively rapid heat transfer from the lead into the aluminum molding substrate. Furthermore, the use of this hard surface anodized surface allows for the utilization of aluminum, a material which is normally not available for use as a mold or mold substrate material due to the fact of its tendency to "overchill" the part which is to be cast, causing uneven cooling and premature hardening. Finally, the hard surface anodized molding surface provides excellent texturing and release characteristics which allow the solidified battery grid to be removed easily therefrom, thereby facilitating the production of dimensionally uniform warp-free textured battery grids from molds which last through months of constant use without the need for reanodizing.

The primary object of the present invention is the provision of a method of casting automotive battery lead parts and more particularly automotive battery grids which are dimensionally stable, substantially warp-free and of a quality heretofore unobtainable by the prior art processes. This and other objects of the present invention will become apparent from the following detailed description.

DETAILED DESCRIPTION OF THE INVENTION

Figure 1:
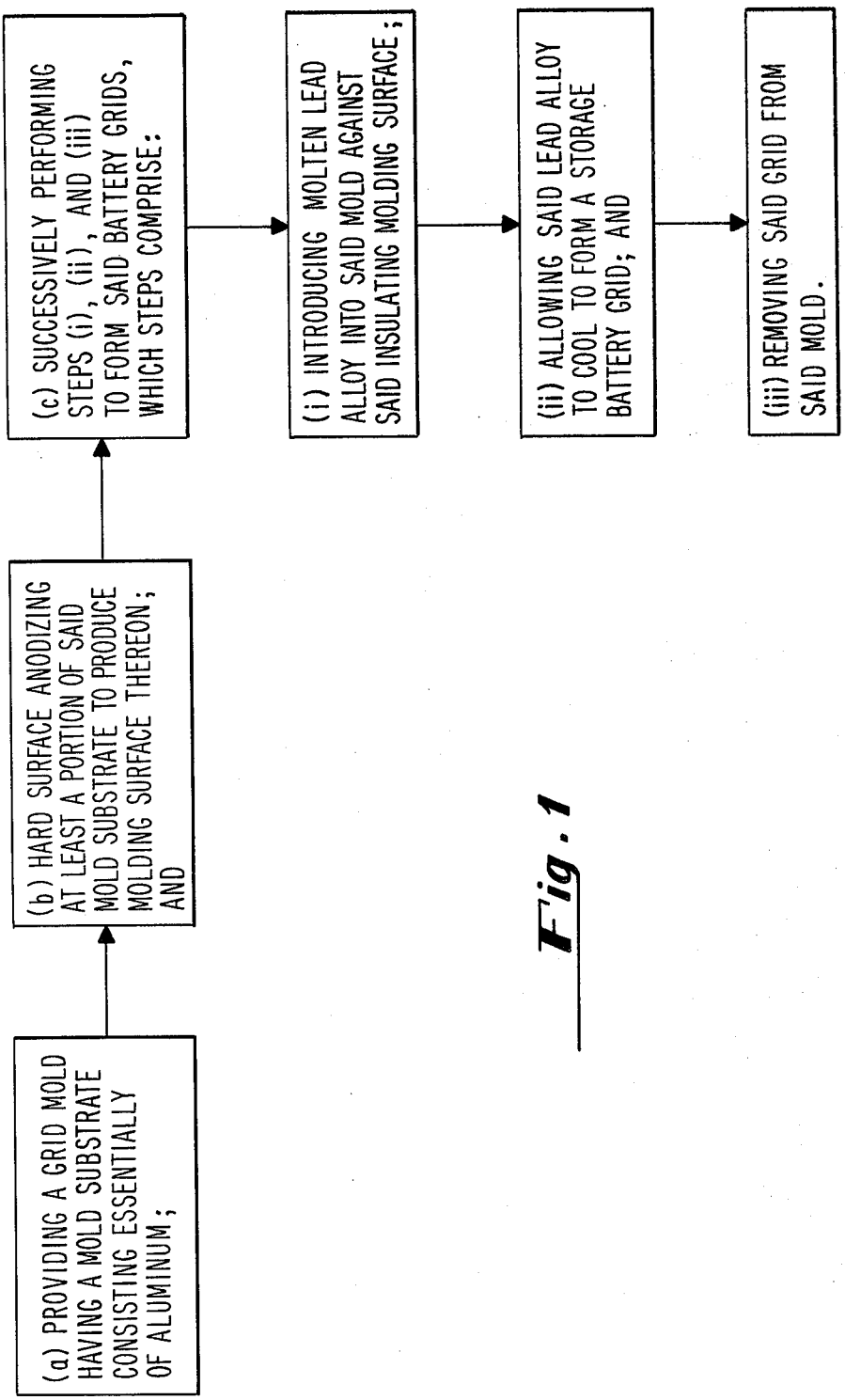
FIG. 1 is a flow chart describing the method of the present invention for producing storage battery grids.

Although specific forms of the invention have been selected for illustration, and the following description is drawn in specific terms for the purpose of describing these forms of the invention, this description is not intended to limit the scope of the invention which is defined in the appended claims.

Referring to FIG. 1, the present invention comprises a method of producing storage battery parts and more particularly the grids thereof utilizing a process comprising the steps of (a) providing a grid mold having a mold substrate consisting essentially of aluminum; (b) hard surface anodizing at least a portion of said mold substrate to produce molding surface thereon; and (c) successively performing steps (i), (ii) and (iii) to form said battery grids, which steps comprise:

(i) introducing molten lead alloy into said mold against said insulating molding surface;

(ii) allowing said lead alloy to cool to form a storage battery grid; and (iii) removing said grid from said mold.

The first step of the above described method, namely the step of providing a grid mold having a mold substrate consisting essentially of aluminum, may be accomplished either by providing a mold which is composed entirely of aluminum or aluminum alloys or may be provided by laminating an aluminum or aluminum alloy material to a conventional mold material such as cast iron. In addition to providing an aluminum mold substrate material, the preferred embodiment of applicant's invention further contemplates the use of a cooling means, such as a water circulation system, in order to draw heat from the aluminum mold substrate. It is believed that the use of aluminum as a mold substrate facilitates the uniform cooling of the battery grids which are cast, which uniform cooling provides battery grids of extremely strength and dimensional stability.

The next step in the process, namely the step of hard surface anodizing of at least a portion of said mold substrate to produce a molding surface thereon may be accomplished using any one of the hard surface anodizing processes known for hard surface anodizing aluminum parts to increase their abrasion resistance and durability. One such hard surface anodizing process which is acceptable for use in the method of the present invention is described in U.S. pat. Nos. 1,900,472 and 1,965,682. More recent hard surface anodization processes are described in U.S. Pat. Nos. 2,161,636, 3,146,178, 3,227,639, 3,252,875, 3,738,921 and 3,804,731. In spite of the fact that hard surface anodizing is well known in the aircraft and other industries, it is believed that its use in the battery industry, more particularly to form an insulating molding surface as described herein is both novel and would be unobvious to one of ordinary skill in the battery grid casting art.

The third step of applicants process, namely the step of successively performing the introduction of molten lead alloy into the mold against the molding surface, the step of allowing the lead alloy to cool to form the storage battery grid, and the removal of the grid from the mold is performed in a way which is substantially similar to the way those steps are performed using molds treated with the cork flour spray process described above, with the exception that, of course, this prior art process does not introduce molten lead alloy into said mold against said such a molding surface, nor is the lead alloy allowed to cool to form said storage battery grid while taking advantage of the heat transfer and other characteristics provided by the first two steps of the process of the present invention.

One alternate embodiment of applicants invention is directed to a novel texturing of the mold substrate prior to the hard surface anodizing step to form a discontinuous, rough or "pebbled" surface thereon which improves a surface characteristic of the mold after the hard surface anodizing step. In particular, it is contemplated that this texturing step encompasses all of those techniques normally available in the art of working aluminum and, in addition, certain particular methods of texturing which are believed to be particularly well suited to producing the type of textured finish which is required on the mold substrate prior to the hard surface anodizing step. One of these methods of texturing comprises the step of peening the substrate with shot, while a second of these methods comprises the step of blasting the mold substrate with glass beads. A third of these texturing processes comprises the step of blasting the substrate with sand. Depending upon the final textured surface which is desired, any one of these processes, or a combination thereof may be utilized in order to obtain the desired texture of the completed battery and grids. since the hard surface anodizing step alters the final dimensions of the mold substrate by a matter of between five one-hundred-thousands of an inch and five-hundred one-hundred-thousands of an inch, and because the hard surface anodizing process will uniformally coat the desired portion of the mold substrate, the final texture of the mold will be substantially similar to the final texture produced by texturing the mold substrate. In the preferred embodiment anodization which increases the dimension of the mold by between 0.0020 and 0.0030 inches is preferred. Another alternate embodiment of the present invention, as mentioned above, further comprises the step of cooling said mold substrate, thereby allowing said lead alloy to form a storage battery.

Although the above described process is most satisfactory for use with lead alloys containing antimony as a hardener, the present process is also particularly useful for calcium containing lead alloys such as are utilized in producing battery grids for maintenance free batteries.

It will be understood that various changes in the details, materials and arrangement of parts which have been described and illustrated in order to explain the nature of this invention, may be made by those skilled in the art within the principle and scope of the invention as expressed in the appended claims.

What is claimed is:

1. A method of producing a storage battery grid of uniform thickness comprising the steps of:
    (a) providing a grid mold having a mold substrate consisting essentially of aluminum and defining a grid mold cavity comprising a shallow lattice of thin grid strut mold voids having dimensions larger than those of the grid to be cast therein;
    (b) hard surface anodizing at least a portion of said mold substrate to produce an insulating molding surface thereon and to reduce the dimension of said grid mold cavity to the desired grid dimensions to be cast therein;
    (c) introducing molten lead alloy into said grid mold cavity against said insulating molding surface, said molding surface allowing said molten lead alloy to flow into and fill all of the interstices of said mold; and
    (d) allowing said lead alloy to cool to produce a dimensionally uniform storage battery grid comprising a lattice of thin lead struts.

2. A method of producing a storage battery grid comprising the steps of:
    (a) providing a grid mold having a mold substrate consisting essentially of aluminum and defining a grid mold cavity comprising a shallow lattice of thin grid-strut mold voids having dimensions larger than those of the grid to be cast therein;
    (b) hard surface anodizing at least a portion of said mold substrate to produce an insulating molding surface thereon and to reduce the dimensions of said grid mold cavity to the desired grid dimensions to be cast therein;
    (c) successively performing the following steps to form the desired number of said battery grids thereon;
        (i) introducing molten lead alloy into said grid mold cavity against said insulating molding surface, said molding surface allowing said molten lead alloy to flow into and fill all of the interstices of said mold;
        (ii) allowing said lead alloy to cool to form said storage battery grid lattice; and
        (iii) removing said grid from said mold to produce a dimensionally uniform storage battery grid comprising a lattice of thin lead struts.

3. The method of claim 2 comprising the additional step of texturing said mold substrate prior to said hard surface anodizing step to subsequently form a textured molding surface thereon for producing a texture on said grid to positively engage lead oxide battery paste upon subsequent application of said paste to said grid.

4. The method of claim 3 wherein said texturing step comprises the step of peening said substrate with shot.

5. The invention of claim 3 wherein said texturing step further comprises the step of blasting said substrate with glass beads.

6. The method of claim 3 wherein said texturing step further comprises the step of blasting said substrate with sand.

7. The method of claim 2 wherein said hard surface anodizing step produces a molding surface providing an added thickness to said substrate of between 0.00001 inches and 0.00500 inches.

8. The method of claim 7 wherein said hard surface anodizing step produces a molding surface providing an added thickness to said substrate of between 0.0020 and 0.0030 inches.

9. The method of claim 2 wherein said step of allowing said lead alloy to cool further comprises the step of simultaneously cooling said mold substrate.

* * * * *